Figure 8:
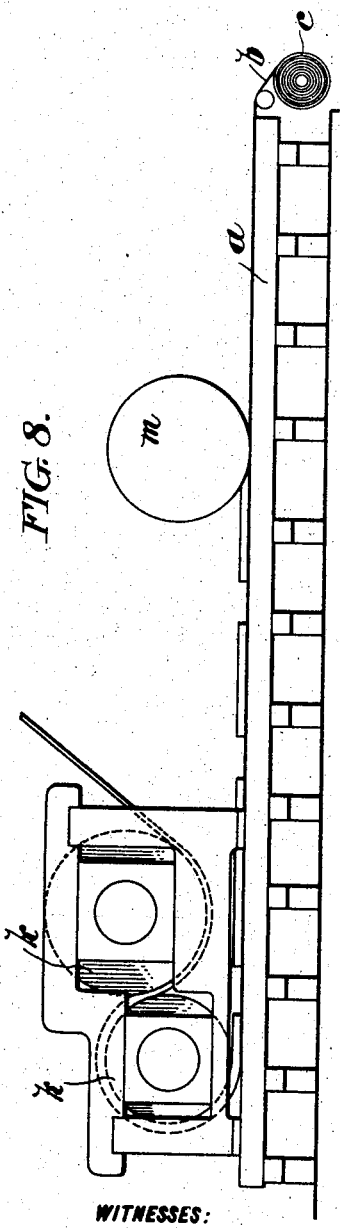

No. 781,378. PATENTED JAN. 31, 1905.
H. A. STAEDING.
PROCESS OF MAKING INLAID LINOLEUM.
APPLICATION FILED JAN. 22, 1904.
3 SHEETS—SHEET 1.
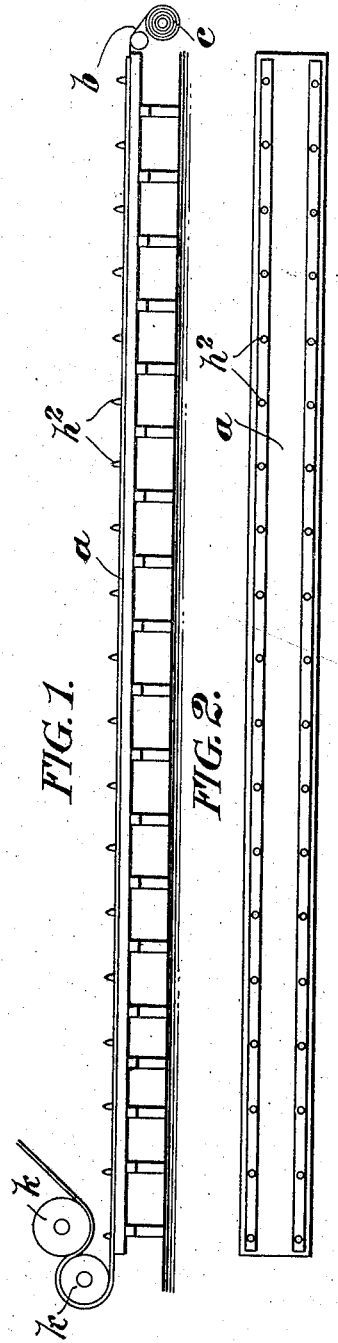
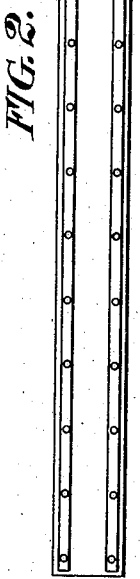
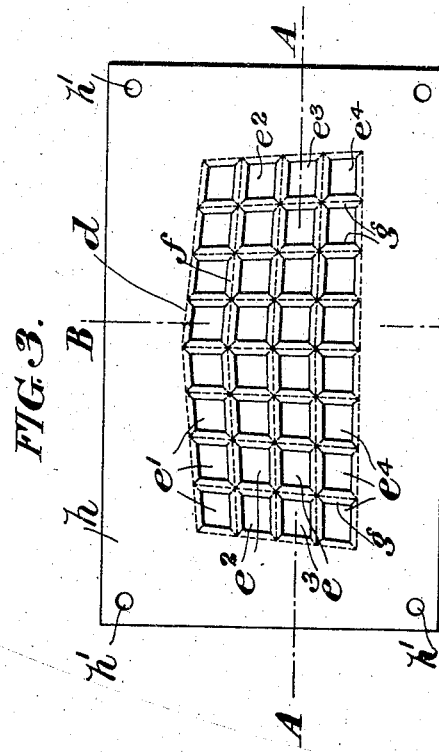
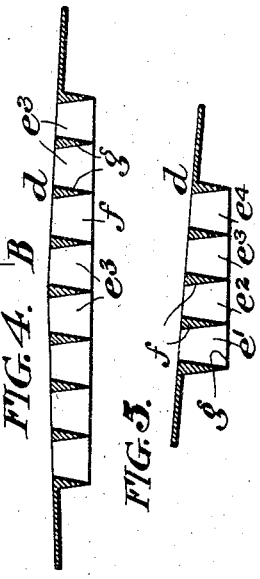
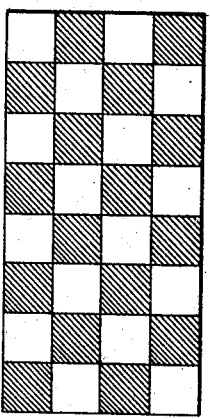
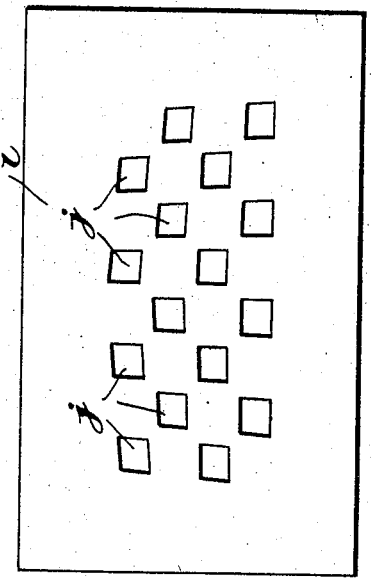
WITNESSES:
INVENTOR
Hugh A. Staeding
BY
ATTORNEY.

No. 781,378. PATENTED JAN. 31, 1905.
H. A. STAEDING.
PROCESS OF MAKING INLAID LINOLEUM.
APPLICATION FILED JAN. 22, 1904.

3 SHEETS—SHEET 2.

WITNESSES:

INVENTOR
Hugh A. Staeding
BY
ATTORNEY.

No. 781,378. PATENTED JAN. 31, 1905.
H. A. STAEDING.
PROCESS OF MAKING INLAID LINOLEUM.
APPLICATION FILED JAN. 22, 1904.
3 SHEETS—SHEET 3.
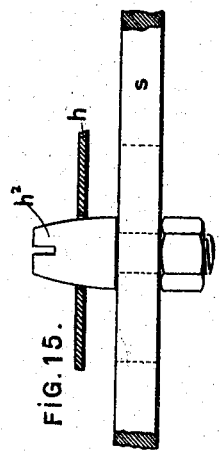
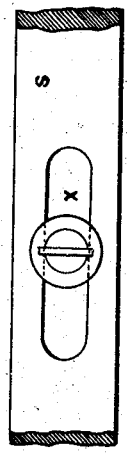
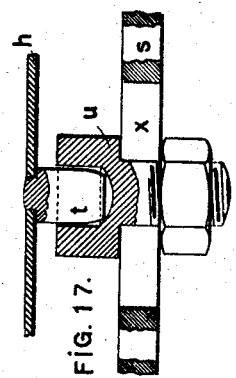
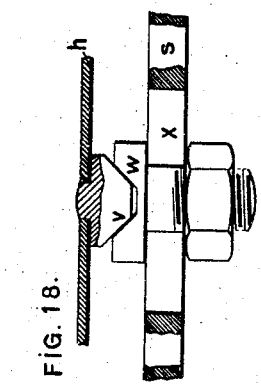
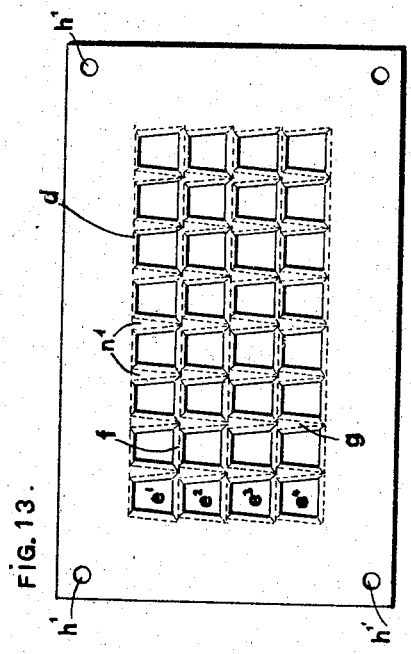
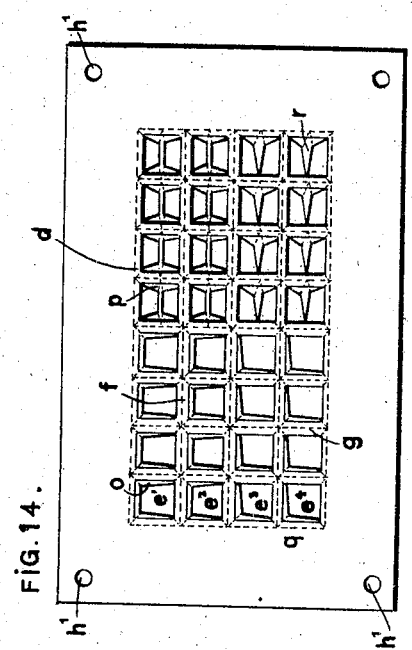
WITNESSES:
R. M. Kelly.
M. J. Eyth.
INVENTOR
Hugh A. Staeding
BY
ATTORNEY.

No. 781,378.

Patented January 31, 1905.

UNITED STATES PATENT OFFICE.

HUGH A. STAEDING, OF CAMDEN, NEW JERSEY.

PROCESS OF MAKING INLAID LINOLEUM.

SPECIFICATION forming part of Letters Patent No. 781,378, dated January 31, 1905.

Application filed January 22, 1904. Serial No. 190,201.

*To all whom it may concern:*

Be it known that I, HUGH A. STAEDING, of the city and county of Camden and State of New Jersey, have invented an Improvement in Processes of Making Inlaid Linoleum, of which the following is a specification.

One method of making inlaid linoleum as now practiced is to assemble a number of molded tesseræ—formed of a granular composition of cork-flour, wood-flour, and coloring-matter mixed with a cement of oxidized oil and various gums—in proper relation to form the design and to compress them into a smooth sheet on a jute foundation by a flat press. Another method is to form flat sheets of the composition to cut out the tesseræ from sheets of different colors and assemble and compress them on the jute foundation. A better compression and consolidation of the granular material can be obtained by passing the sheet of assembled and uncompressed tesseræ between calender-rolls; but the rolling action of such rolls pushes back a certain percentage of the granular material and elongates and distorts the pattern.

It is the object of my invention to produce inlaid linoleum by compression between calender-rolls without substantial elongation or distortion of the pattern. This result I accomplish by molding the tesseræ in the first instance of such distorted shape and thickness that when assembled and rolled out by the calender-rolls to the final uniform thickness the distortion will be removed and the tesseræ will be rolled out into the exact shape required by the pattern. The proper distortion in the shape and thickness of the tesseræ may be obtained by molding the granular material in the first instance in grids having molds of a form corresponding with the distorted form to be produced. In forming multicolored designs suitable templets may be used in combination with the grids to produce distorted tesseræ of one color properly disposed or assembled with reference to those of another color.

I prefer to form the granular material of the usual ingredients—cork-flour, wood-flour, and the like, with coloring-matter—mixed with a specially-prepared oil, boiled and oxidized in kettles by fire-heat, by what is known as the Taylor system; but I do not mean to limit my process to any particular composition of adhesive granular material.

In the drawings I have shown two forms of apparatus adapted for carrying out my invention.

Figure 11:
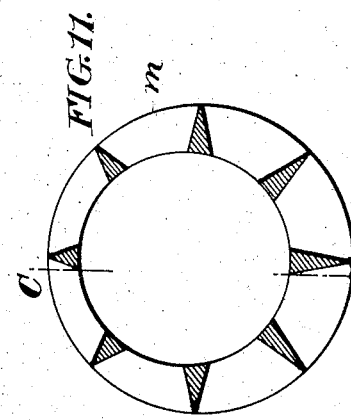
Figure 12:
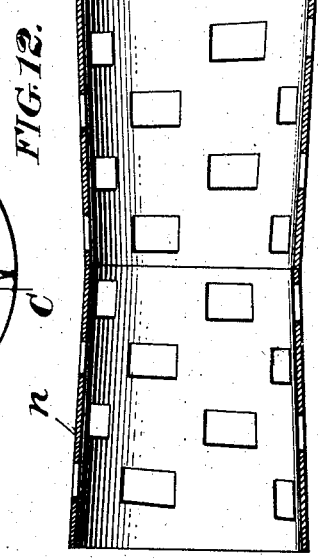
Figure 9:
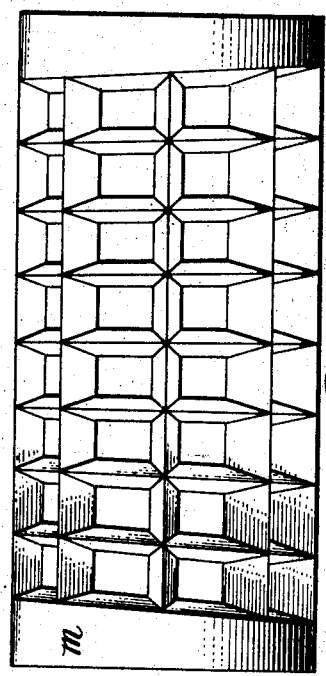
Figure 10:
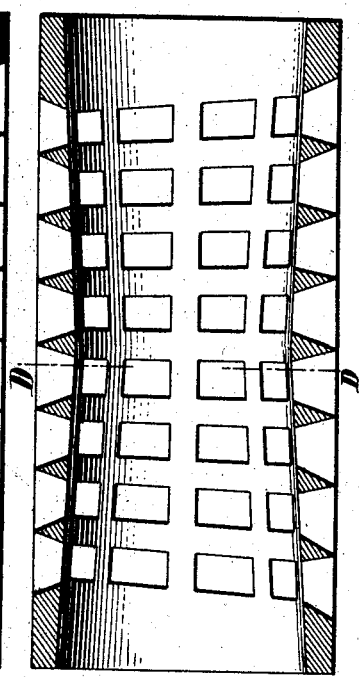

Figure 1 is a side elevation of a molding-table with the calender-rolls. Fig. 2 is a plan view of the table. Fig. 3 is a plan view of a grid for molding the tesseræ. Figs. 4 and 5 are respectively longitudinal and transverse sections on the line A A and B B. Fig. 6 is a plan view of a templet adapted for use in connection with the grid shown in Fig. 3. Fig. 7 is a linoleum pattern produced by the use of the grid and templets shown in Figs. 3 and 6 after compression. Fig. 8 is a side elevation of a molding-table and compression-rolls, illustrating the molding of the tesseræ in a cylindrical grid. Fig. 9 is an elevation of the cylindrical grid. Figs. 10 and 11 are respectively longitudinal and transverse sections on the lines C C of Fig. 11 and D D of Fig. 10, respectively. Fig. 12 is a longitudinal section of a form of templet adapted for use with the grid shown in Figs. 9, 10, and 11. Figs. 13 and 14 are plan views of other forms of molding-grids adapted for carrying out my invention, and Figs. 15, 16, 17, and 18 are detail views illustrating different forms of the devices for registering the molding-grids in proper position on the molding-table.

My process consists in molding the tesseræ in the first instance of a form distorted in length, width, and thickness to an extent proportional to the amount of horizontal displacement of material due to the rolling-out action of the calender-rolls and with the upper surface inclined or pitched to the upper corners, so that the calender-rolls will act to roll out the material by a continuous rolling action to the required thickness and in so doing will spread out the material to the proper length and width to form the exact shape desired.

In the apparatus illustrated in Sheet 1, $a$ is a suitable table over which is stretched a strip of burlap or jute backing $b$ from a roll $c$. $d$ is the molding-grid, having a series of apertures or open molds $e'\ e^2\ e^3\ e^4$, formed by longitudinal and transverse partitions $f\ g$. The upper surface of the grid in which the molds are located is inclined from the two side edges toward the center line and from the lower edge toward the top, thus presenting two inclined faces, one on each side of the transverse center line, each inclining from one lower corner to the center line at the top. The lower edges of the partitions $f$ and $g$ are in a horizontal plane. The transverse partitions $g$ on each side of the center partition are slighly inclined toward the center, and the longitudinal partitions $f$ on each side are also slightly inclined, so as to meet at an angle in the central partition $g$, forming a pentagonal outline. With this construction each mold $e'\ e^2\ e^3\ e^4$ is of the form of a distorted cube with a horizontal base plane and an inclined top plane having its apex at the upper inner corner. The edges of the grid-frame are extended laterally and may be provided with holes $h'$, adapted to receive registering-pins $h^2$ on the table. $i$ is a templet having its under surface complementary to the upper surface of the grid and provided with a series of apertures $j$ corresponding in size and shape to certain molds in the grid, according to the character of the pattern which is to be produced.

In the drawings I have shown one of the templets adapted for use with the grid of Fig. 3 for the production of the two-colored checkered pattern, shown in Fig. 7. In this case the templet is formed with apertures $j$ corresponding with alternate molds in the grid. The grid and templets are used in the following manner in forming and assembling the tesseræ: The grid is first placed upon the table on the centering-pins and over the backing-strip $b$. One templet $i$ is placed upon the face of the grid, thus leaving alternate molds open, with the others closed. The granular material of one color—say black—is then filled into the open molds. When these are filled, the first templet is removed and a second one is applied identical with the first, except that its openings $j$ register with the other set of molds, the first set of filled molds now being closed by the templet. The granular material of the other color—say white—is then filled into the open molds, and the grid and templet are removed and may again be applied in the next adjacent position on the table to assemble a second series of tesseræ. The grids are arranged transversely on the table with the lower straight edges formed by the molding-pockets $e^4$ in front. As the burlap or jute backing is moved forward it carries the assembled tesseræ between a pair of calender-rolls $k\ k$, arranged at one end of the table and at sufficient distance apart to compress the granular material to the required uniform thickness. Each body of granular material composed of a set of assembled tesseræ by the use of the grid shown in Figs. 3, 4, and 5 to form the pattern shown in Fig. 7 is of pentagonal outline corresponding with the bounding-lines of the outer grid-pockets and has two oppositely-inclined upper faces inclining from the outer lower corners to the apex at the top of the center line. As the material passes to the rolls $k\ k$ the lower portion first meets them, and as the material is compressed each tessera is reduced to the proper thickness and shape to produce the desired pattern. This result is due to the fact that each tessera is distorted in length, width, and thickness to an extent proportional to the amount of horizontal displacement of material due to the rolling-out action of the calender-rolls and also has a pitch to the corners, so that the calender-rolls will act to roll out the material by a continuous rolling action to the required thickness and in so doing will spread out the material to the proper length and width. To produce the required distortion on the tesseræ in the first instance, it is not necessary to use a grid having a distorted outline, as shown in Fig. 3, as the same result may be accomplished, e. g., with a grid of the character shown in Fig. 13, in which the molds are all arranged in regular lines with reference to one another and to the pattern to be produced and the distortion in the molds is produced by unequal thicknesses in the partition-walls, as shown at $n'$, or with a grid of the character shown in Fig. 14, in which the molds are all of equal size and undistorted shape and the distortion in the molded tesseræ is produced by the introduction of filling-pieces, such as $o\ p\ q\ r$.

In making a continuous linoleum strip with a repeated pattern the tesseræ are assembled in the manner described at successive registered points along the backing-strip and are then carried by the strip between the calender-rolls and compressed successively into adhesion with the foundation-strip to form an unbroken compressed surface of granular material.

It is desirable that the means for registering the position of the grids with reference to the table should be capable of adjustment to suit variations in the pattern or in the size of the grids. For this purpose the pins $h^2$ may be provided with adjustable shanks movable in slots $x$ in the table or grid-supports, as shown in Figs. 15 and 16, or the grids may be provided with pins or projections $t$ or $v$, adapted to adjustable sockets $u$ or $w$.

The process is not limited to the production of any particular design or to any number of colors. For example, with the grid shown in Fig. 3 a design of three or more different colors might be obtained by the use of proper templets and properly-colored granular material and the colored squares might be arranged in any relation to produce any desired design; nor is the process limited to the production of a design made up of component elements of any particular shape, such as the squares shown in Fig 7. Any forms may be produced by shaping the molding-pockets in the grid to produce distorted tesserae of proper form to obtain the required shape in the design when the tesserae are compressed by the calender-rolls. Whatever the shape of final pattern may be, it may be obtained in any case by molding the body of granular material in the first instance into a distorted shape and thickness with reference to the final shape to be produced, the distortion being proportional to the amount of horizontal displacement during compression, and then rolling out the granular material upon a suitable backing to a uniform thickness sufficient to remove the distortion.

The distortion formed in the molded tesserae in the first instance is in the entire mass of the material. When distorted in length or breadth with molds of the form shown, the distortion appears in both faces, so that each distorted body when deposited on the backing-strip does not cover the entire surface of the space finally occupied by it when compressed into the finished tessera. With the particular grids shown it will be noted that some of the distorted bodies will contain more material than others, from which it results that when the tesserae are compressed to a uniform thickness the overplus of material in the bodies of larger mass is carried into the bodies of less mass, while the surfaces which form the face of the finished product are rolled out under compression into the exact shape desired, On Sheet 2 I have shown a cylindrical grid for molding and assembling the tesserae on the burlap, in which the general form of the molds is the same as that shown in Fig. 3, except that they are formed in the walls of a cylinder $m$, which may be rolled or rotated over the surface of the burlap. The granular material is forced into the molds from the inside of the cylinder, and suitable conical templets $n$ may be used to close part of the molds to assemble tesserae of different colors in the manner described. In Fig. 12 the conical templet $n$ is shown formed in two pieces adapted to be inserted in the grid $m$ from opposite ends. The cylindrical grid may be driven at a different speed from the calender-rolls.

To reduce the amount of elongation of the tesserae when compressed as much as possible, and consequently to diminish the amount of distortion required, I prefer to use calender-rolls of different diameters, the diameter of the back roll being equal to the diameter of the face-roll plus the thickness of the material.

What I claim as new, and desire to secure by Letters Patent, is as follows:

1. The herein-described method of making inlaid linoleum, which consists in first molding a series of tesserae, constituting a complete set composing the design, into forms having their faces of distorted shape with reference to the final shape to be produced—said distortion being proportional to the amount of horizontal displacement during compression—and then rolling out and compressing said series of tesserae to a uniform thickness to remove the distortion.

2. The herein-described method of making inlaid linoleum, which consists in first molding a series of tesserae, constituting a complete set composing the design, into forms having their faces of shortened length to compensate for the amount of horizontal displacement under compression, and then rolling out and compressing said series of tesserae to a uniform thickness to remove the distortion.

3. The herein-described method of making inlaid linoleum, which consists in first molding a series of tesserae, constituting a complete set composing the design, into forms having their faces of distorted width to compensate for the amount of horizontal displacement under compression, and then rolling out and compressing said series of tesserae to a uniform thickness to remove the distortion.

4. The method of making inlaid linoleum which consists in molding a body of linoleum composition in the first instance into an unequal thickness to compensate for the amount of horizontal displacement under compression, and then compressing the same to an extent sufficient to remove the distortion.

5. The herein-described method of making inlaid linoleum, which consists in first molding a series of tesserae, constituting a complete set comprising the design, into forms having their faces of shortened length and distorted width to compensate for the amount of horizontal displacement under compression, and then compressing the same to an extent sufficient to produce the required elongation and remove the distortion in width.

6. The method of making inlaid linoleum, which consists in molding a body of linoleum composition in the first instance into a form of shortened length and unequal thickness to compensate for the amount of horizontal displacement under compression, and then compressing the same to an extent sufficient to produce the required elongation and reduce the body to a uniform thickness.

7. The method of making inlaid linoleum, which consists in molding a body of linoleum composition in the first instance with a form of distorted width and unequal thickness to compensate for the amount of horizontal displacement under compression, and then compressing the same to a uniform thickness to an extent sufficient to remove the distortion in width.

8. The method of making inlaid linoleum, which consists in molding a body of linoleum composition in the first instance into a form of distorted width shortened length and unequal thickness to compensate for the amount of horizontal displacement under compression, and then compressing the same to a uniform thickness to an extent sufficient to remove the distortion in width and produce the required elongation.

9. The process of making inlaid linoleum, which consists in molding upon a stationary support the series of tesserae, constituting a complete set composing the design, into forms having faces of distorted form, and then rolling out and compressing the entire series in adhesion with a suitable backing to a uniform thickness sufficient to remove the distortion and produce the desired design.

10. The process of making inlaid linoleum, which consists in molding the series of tesserae, constituting a complete set composing the design, into bodies having faces of distorted form, the amount of distortion in each tessera being proportional to the amount of horizontal displacement under compression, and said tesserae being assembled in proper relative positions according to the relative degree of distortion to produce the desired design, and then rolling out the assembled tesserae in adhesion with a suitable backing to a uniform thickness sufficient to remove the distortion.

11. The process of making inlaid linoleum which consists in molding a body of granular material in the first instance into a distorted shape with reference to the final shape to be produced and with an upper pitched surface, and then rolling out the same in adhesion with a suitable backing to a uniform thickness to an extent sufficient to remove the distortion.

12. The herein-described method of making inlaid linoleum, which consists in first assembling a series of properly-disposed bodies of linoleum material of relatively distorted shape with reference to one another and to the pattern to be produced on a continuous strip of backing material and then rolling them out by a continuous operation into a uniform thickness to an extent sufficient to remove the distortion.

13. The herein-described method of making inlaid linoleum, which consists in first assembling upon a stationary support a series of sets of tesserae formed of molded bodies of linoleum material, each set containing all of the tesserae necessary to form the complete design, and then rolling out said series of sets of assembled tesserae to a uniform thickness in adhesion with a backing-strip by a continuous operation, to form a strip of inlaid linoleum having a series of successive patterns.

14. The herein-described method of making inlaid linoleum, which consists in first assembling upon a stationary support a series of tesserae formed of molded bodies of linoleum material having their upper faces distorted into a geometrical shape different from the shape of the design to be produced, and then rolling out said bodies in adhesion with a suitable backing to remove the distortion and produce the desired geometrical shapes.

In testimony of which invention I hereunto set my hand.

HUGH A. STAEDING.

Witnesses:
ERNEST HOWARD HUNTER,
R. M. KELLY.